(12) United States Patent
Ishikawa

(10) Patent No.: US 8,427,913 B2  
(45) Date of Patent: *Apr. 23, 2013

(54) SERVO CONTROL SIGNAL GENERATION DEVICE AND AN OPTICAL DISK DEVICE USING THE SAME

(75) Inventor: Yoshinori Ishikawa, Yokohama (JP)

(73) Assignees: Hitachi, Ltd., Tokyo (JP); Hitachi-LG Data Storage, Inc., Tokyo (JP)

(*) Notice: Subject to any disclaimer, the term of this patent is extended or adjusted under 35 U.S.C. 154(b) by 40 days.

This patent is subject to a terminal disclaimer.

(21) Appl. No.: 12/689,793

(22) Filed: Jan. 19, 2010

(65) Prior Publication Data

US 2010/0118670 A1    May 13, 2010

Related U.S. Application Data

(63) Continuation of application No. 11/489,584, filed on Jul. 20, 2006, now Pat. No. 7,663,986.

(30) Foreign Application Priority Data

Oct. 20, 2005 (JP) ................................. 2005-305164

(51) Int. Cl.
    *G11B 7/00* (2006.01)
(52) U.S. Cl.
    USPC ................. 369/44.29; 369/44.27; 369/44.39; 369/53.2
(58) Field of Classification Search ................. 369/47.35
    See application file for complete search history.

(56) References Cited

U.S. PATENT DOCUMENTS

| | | | |
|---|---|---|---|
| 4,688,203 A | 8/1987 | Koishi et al. | |
| 4,868,819 A | 9/1989 | Kimura | |
| 5,844,871 A * | 12/1998 | Maezawa | 369/44.28 |
| 5,896,365 A * | 4/1999 | Hiroki | 369/275.4 |
| 6,028,829 A | 2/2000 | Yamazaki | |

(Continued)

FOREIGN PATENT DOCUMENTS

| | | |
|---|---|---|
| JP | 59-104332 | 7/1984 |
| JP | 61-134930 | 6/1986 |

(Continued)

OTHER PUBLICATIONS

Japanese Office Action issued in Japanese Patent Application No. JP 2005-305164 dated Feb. 16, 2010.

(Continued)

*Primary Examiner* — Lixi C Simpson

(74) *Attorney, Agent, or Firm* — McDermott Will & Emery LLP

(57) ABSTRACT

A servo control signal generation device for discriminating a kind of an optical disk, changing over between top and bottom envelope signals of an RF signal, and generating a defect signal and a mirror signal includes an RF generator for generating the RF signal from reflected light of an optical disk, a disk discriminator for discriminating a kind of the optical disk from the RF signal, and a top envelope generator and a bottom envelope generator respectively for generating the top and bottom envelope signals of the RF signal. If the disk has reflectance after recording which is lower than that before recording, the defect and mirror signals are generated respectively from the top and bottom envelope signals. If the disk has reflectance after recording which is higher than that before recording, the defect and mirror signals are generated respectively from the bottom and top envelope signals.

8 Claims, 7 Drawing Sheets

U.S. PATENT DOCUMENTS

| | | |
|---|---|---|
| 2001/0053110 A1 | 12/2001 | Shibuya |
| 2003/0152000 A1* | 8/2003 | Yamanoi et al. ........... 369/53.22 |
| 2005/0105459 A1 | 5/2005 | Tamura et al. |
| 2005/0128917 A1* | 6/2005 | Ogawa et al. .............. 369/59.23 |

FOREIGN PATENT DOCUMENTS

| | | |
|---|---|---|
| JP | 63-167430 | 7/1988 |
| JP | 63-191380 | 8/1988 |
| JP | 02-005238 | 1/1990 |
| JP | 04-149824 | 5/1992 |
| JP | 06-150329 | 5/1994 |
| JP | 2512087 | 4/1996 |
| JP | 10-21547 | 1/1998 |
| JP | 2001-357543 | 12/2001 |
| JP | 2003-030850 | 1/2003 |
| JP | 2003-242658 | 8/2003 |
| JP | 2005-166096 | 6/2005 |
| JP | 2005-174528 | 6/2005 |

OTHER PUBLICATIONS

Japanese Office Action issued in Japanese Patent Application No. 2010-095606, mailed Aug. 17, 2010.

Japanese Office Action issued in Japanese Patent Application No. JP 2010-095606 dated May 24, 2011.

Japanese Office Action issued in Japanese Patent Application No. JP 2010-095606 dated Aug. 16, 2011.

Japanese Office Action issued in Japanese Patent Application No. JP 2010-095606 dated Nov. 8, 2011.

* cited by examiner

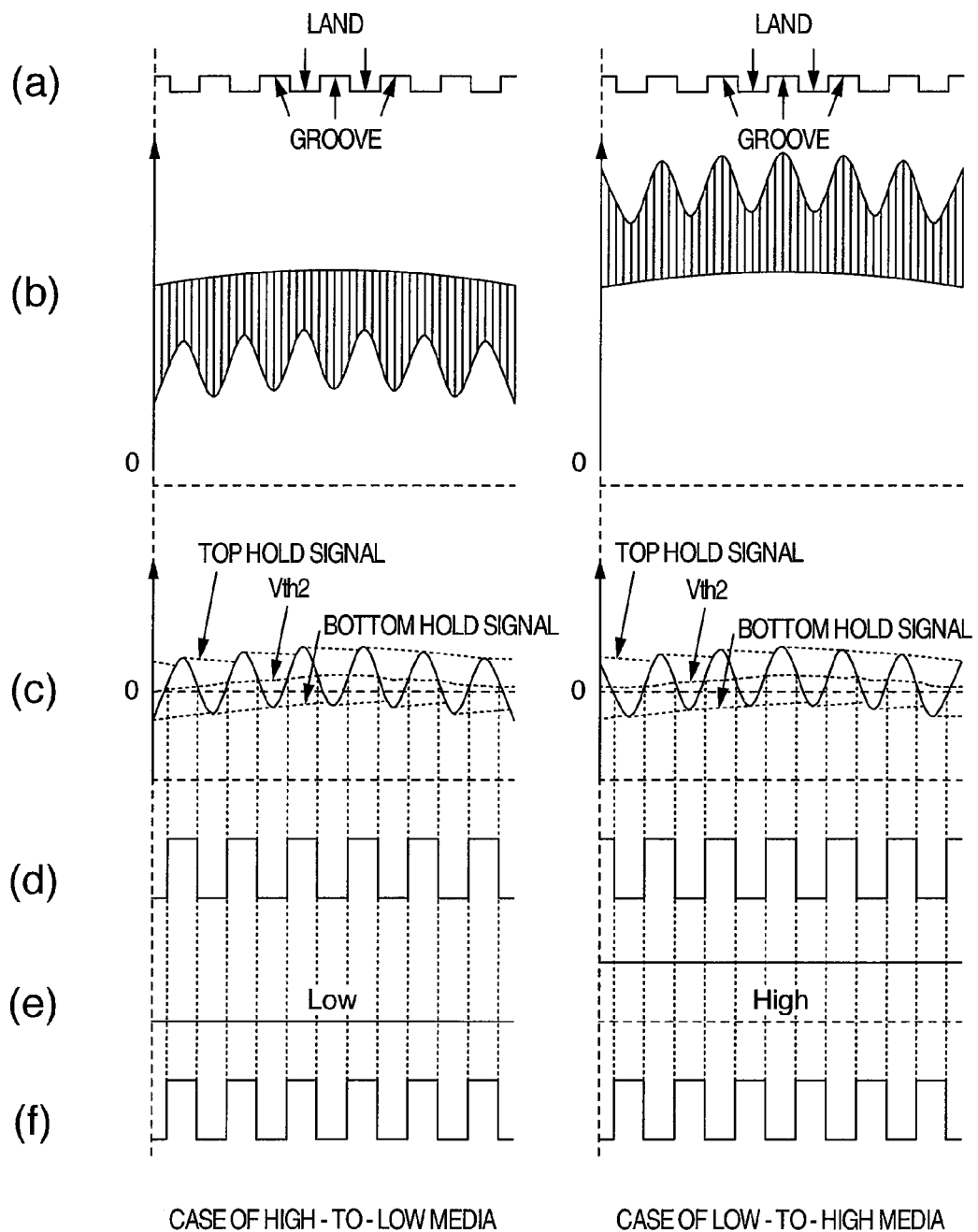

SERVO CONTROL SIGNAL GENERATION DEVICE AND AN OPTICAL DISK DEVICE USING THE SAME

RELATED APPLICATIONS

This application is a Continuation of U.S. application Ser. No. 11/489,584, filed on Jul. 20, 2006, now U.S. Pat. No. 7,663,986, claiming priority of Japanese Patent Application No. 2005-305164, filed on Oct. 20, 2005, the entire contents of each of which are hereby incorporated by reference.

BACKGROUND OF THE INVENTION

The present invention relates to a servo control signal generation device for detecting a defect signal and a mirror signal, and an optical disk device using the servo control signal generation device.

When playing back an optical disk, dust which adheres to the surface of the optical disk or a scratch on the surface of the optical disk, if any, disturbs a servo signal and makes accurate servo control impossible. A transient response of servo control caused by dust or a scratch can be stabilized by generating a defect signal from an RF signal to detect a defect part such as the dust or scratch and causing hold operation of servo control over a defect time period. As a generation method of the defect signal, a method of using a top envelope of the RF signal is disclosed. See, for example, JP-A-10-21547.

In the optical disk device, a mirror signal can be used to count the number of crossing tracks in seek operation for moving an optical pickup in a disk radial direction to a desired address position on the optical disk. In tracking pull-in at the end of the seek operation, tracking brake operation for generating a tracking brake pulse by using a phase relation between the mirror signal and a tracking zero-cross signal and outputting only a drive signal that acts in a direction opposite to a movement direction of an objective lens from among tracking drive signals by using the tracking brake pulse is conducted. As a method for generating the mirror signal, a method using a bottom envelope of the RF signal is disclosed. See, for example, JP-A-2003-242658.

As for write once optical disks such as widely spread CD-R and DVD-R disks at the present time, a type in which the reflectance of a recording film after recording becomes lower than that before recording is typical. In contrast with such an optical disk, however, an optical disk in which the reflectance after recording becomes higher than that before recording is also proposed. See, for example, Japanese Patent No. 2512087 (JP-A-02-005238). Hereafter, optical disks of the type in which the reflectance after recording becomes lower than that before recording are referred to as High-to-Low media, whereas optical disks of the type in which the reflectance after recording becomes higher than that before recording are referred to as Low-to-High media.

SUMMARY OF THE INVENTION

If one optical disk device attempts to generate the defect signal and the mirror signal for both the High-to-Low media and the Low-to-High media, problems described hereafter are caused.

First, a problem concerning the defect signal generation will now be described as a first problem with reference to FIG. 1.

FIG. 1 shows signal waveforms obtained when generating the defect signal from a top envelope of the RF signal according to the prior art. Left-hand waveforms in FIG. 1 are waveforms in the case of High-to-Low media, and right-hand waveforms in FIG. 1 are waveforms in the case of Low-to-High media.

FIG. 1(a) shows RF signal waveforms. In an unrecorded part and a recorded part, the level of the RF signal is lowered by a defect such as dust. By the way, it is supposed that the defects in the unrecorded part and the recorded part have the same size in FIG. 1.

FIG. 1(b) shows top envelopes of the RF signals.

FIG. 1(c) shows defect signals. The top envelope (b) is compared with a threshold voltage Vth1. While the top envelope (b) is lower than Vth1, the defect signal assumes a high level to indicate a defect.

In FIG. 1(c), defects in the unrecorded part and the recorded part can be detected correctly in the case of the High-to-Low media. On the other hand, in the case of the Low-to-High media, a defect can be detected correctly in the unrecorded part, but a defect cannot be detected in the recorded part. This is caused by the fact that the DC level of the top envelope in a defect part in the unrecorded part differs from that in the recorded part in the case of the Low-to-High media. For solving this problem, it is conceivable to adopt a method of changing over the setting of the threshold voltage Vth1 when the optical disk attached to the optical disk device is a Low-to-High medium. However, this results in a complicated scheme.

A problem concerning the mirror signal generation will now be described as a second problem with reference to FIG. 2.

FIG. 2 shows signal waveforms obtained when generating the mirror signal from a bottom envelope of the RF signal according to the prior art. Left-hand waveforms in FIG. 2 are waveforms in the case of High-to-Low media, and right-hand waveforms in FIG. 2 are waveforms in the case of Low-to-High media.

FIG. 2(a) shows sectional views of recording films. The recording films have a land-groove structure. By the way, it is supposed that recording marks are formed only on the grooves and information is already recorded on the grooves.

FIG. 2(b) shows RF signals obtained when a laser spot is crossing tracks in a tracking control off state. In both the High-to-Low media and the Low-to-High media, the RF signal has large amplitude in grooves having recording marks formed therein and the RF signal has small amplitude in lands having no recording marks formed therein. This has the same meaning as that the RF signal is modulated by the recorded tracks/unrecorded tracks. In the High-to-Low media, the bottom envelope is modulated. In the Low-to-High media, the top envelope is modulated.

FIG. 2(c) shows bottom envelopes of the RF signals.

FIG. 2(d) shows mirror signals. The bottom envelope (c) is compared with a threshold voltage Vth2. While the top envelope (c) is higher than Vth2, the defect signal assumes a high level. When recording is conducted on either lands or grooves on an optical disk having a land-groove structure, either lands or grooves on which recording is not conducted are defined as mirror face. In other words, the lands form the mirror face in the case of the present description. When the mirror signal (d) is high, therefore, it is indicated that a laser spot emitted from an optical pickup is located on a land which is on the mirror face.

In the case of the High-to-Low media, the mirror signal (d) assumes a high level on lands as shown in FIG. 2, and the mirror face is detected correctly. On the other hand, in the case of the Low-to-High media, the bottom envelope (c) is higher than Vth2, and consequently the mirror signal (d) always assumes the high level and the mirror face cannot be detected correctly. By the way, the bottom envelope in the Low-to-High media is not modulated by the mirror face and the recording tracks. Even if the DC level is removed, therefore, the mirror signal cannot be detected correctly.

In view of the two problems described heretofore, an object of the present invention is to provide an optical disk device capable of generating the defect signal and the mirror signal correctly for both the High-to-Low media and the Low-to-High media.

The present invention provides a servo control signal generation device that corresponds to reproduction of both optical disks having a reflectance after recording which is lower than that before recording and optical disks having a reflectance after recording which is higher than that before recording, and that generates a defect signal and a mirror signal.

The present invention provides a servo control signal generation device corresponding to reproduction of both optical disks having a reflectance after recording which is lower than that before recording and optical disks having a reflectance after recording which is higher than that before recording, the servo control signal generation device including RF generation means for generating an RF signal on the basis of reflected light of an optical disk, disk discrimination means for discriminating a kind of the optical disk on the basis of the RF signal, top envelope generation means for generating a top envelope signal of the RF signal, and bottom envelope generation means for generating a bottom envelope signal of the RF signal, wherein when the disk discrimination means judges the optical disk to belong to a kind of optical disks having a reflectance after recording which is lower than that before recording, a defect signal is generated from the top envelope signal and a mirror signal is generated from the bottom envelope signal, and when the disk discrimination means judges the optical disk to belong to a kind of optical disks having a reflectance after recording which is higher than that before recording, a defect signal is generated from the bottom envelope signal and a mirror signal is generated from the top envelope signal.

Alternatively, the present invention provides a servo control signal generation device corresponding to reproduction of both optical disks having a reflectance after recording which is lower than that before recording and optical disks having a reflectance after recording which is higher than that before recording, the servo control signal generation device including RF generation means for generating an RF signal on the basis of reflected light of an optical disk, disk discrimination means for discriminating a kind of the optical disk on the basis of the RF signal, top envelope generation means for generating a top envelope signal of the RF signal, bottom envelope generation means for generating a bottom envelope signal of the RF signal, first selection means for selecting and outputting the top envelope signal when the disk discrimination means has judged the optical disk to belong to a kind of optical disks having a reflectance after recording which is lower than that before recording, and selecting and outputting the bottom envelope signal when the disk discrimination means has judged the optical disk to belong to a kind of optical disks having a reflectance after recording which is higher than that before recording, second selection means for selecting and outputting the bottom envelope signal when the disk discrimination means has judged the optical disk to belong to a kind of optical disks having a reflectance after recording which is lower than that before recording, and selecting and outputting the top envelope signal when the disk discrimination means has judged the optical disk to belong to a kind of optical disks having a reflectance after recording which is higher than that before recording, first detection means for detecting a time period over which an output signal level of the first selection means is lower than a first predetermined level, low frequency band rejection means for removing a DC component from an output signal of the second selection means, and second detection means for detecting a time period over which an output signal level of the low frequency band rejection means is higher than a second predetermined level, wherein an output signal of the first detection means is used as a defect signal, and an output signal of the second detection means is used as a mirror signal.

Alternatively, the present invention provides a servo control signal generation device corresponding to reproduction of both optical disks having a reflectance after recording which is lower than that before recording and optical disks having a reflectance after recording which is higher than that before recording, the servo control signal generation device including RF generation means for generating an RF signal on the basis of reflected light of an optical disk, disk discrimination means for discriminating a kind of the optical disk on the basis of the RF signal, top envelope generation means for generating a top envelope signal of the RF signal, bottom envelope generation means for generating a bottom envelope signal of the RF signal, changeover means for changing over between the top envelope signal and the bottom envelope signal and outputting a resultant signal, low frequency band rejection means for removing a DC component from the output of the changeover means, top hold means for holding a top level of an output of the low frequency band rejection means, bottom hold means for holding a bottom level of an output of the low frequency band rejection means, potentiometer means for conducting voltage division between an output signal of the top hold means and an output signal of the bottom hold means and outputting a resultant signal, and comparison means for comparing the output of the low frequency band rejection means with an output of the potentiometer means and outputting a two-valued signal obtained by the comparison as a mirror signal, wherein when the disk discrimination means judges the optical disk to belong to a kind of optical disks having a reflectance after recording which is lower than that before recording, the changeover means outputs the bottom envelope signal, and when the disk discrimination means judges the optical disk to belong to a kind of optical disks having a reflectance after recording which is higher than that before recording, the changeover means outputs the top envelope signal.

By the way, it is desirable that the potentiometer means conducts voltage division between the output signal of the top hold means and the output signal of the bottom hold means with a ratio of 1:1.

In these servo control signal generation devices, the mirror signal may be changed over in polarity according to whether the disk discrimination means judges the optical disk to belong to a kind of optical disks having a reflectance after recording which is lower than that before recording, or the disk discrimination means judges the optical disk to belong to a kind of optical disks having a reflectance after recording which is higher than that before recording.

Alternatively, the disk discrimination means may determine whether the reflectance of the optical disk after recording falls or rises as compared with that before recording, on the basis of a disk ID recorded in a BCA area.

It is desirable that the disk discrimination means determines whether the reflectance of the optical disk after recording falls or rises as compared with that before recording, on the basis of a disk ID recorded in a lead-in area.

By the way, in an optical disk device including such a servo control signal generation device, servo control is brought into hold operation during time when a defect is detected in the defect signal.

In an optical disk device including such a servo control signal generation device, a configuration in which the number of crossing tracks is counted by using the mirror signal may also be used.

In this way, it is possible to generate the defect signal and the mirror signal in both the High-to-Low media and the Low-to-High media.

Other objects, features and advantages of the invention will become apparent from the following description of the embodiments of the invention taken in conjunction with the accompanying drawings.

BRIEF DESCRIPTION OF THE DRAWINGS

FIG. 8 is a waveform diagram showing a generation process of a mirror signal in a second embodiment of the present invention.

DESCRIPTION OF THE EMBODIMENTS

Hereafter, embodiments according to the present invention will be described.

First Embodiment

Hereafter, a first embodiment of the present invention will be described.

Figure 3:
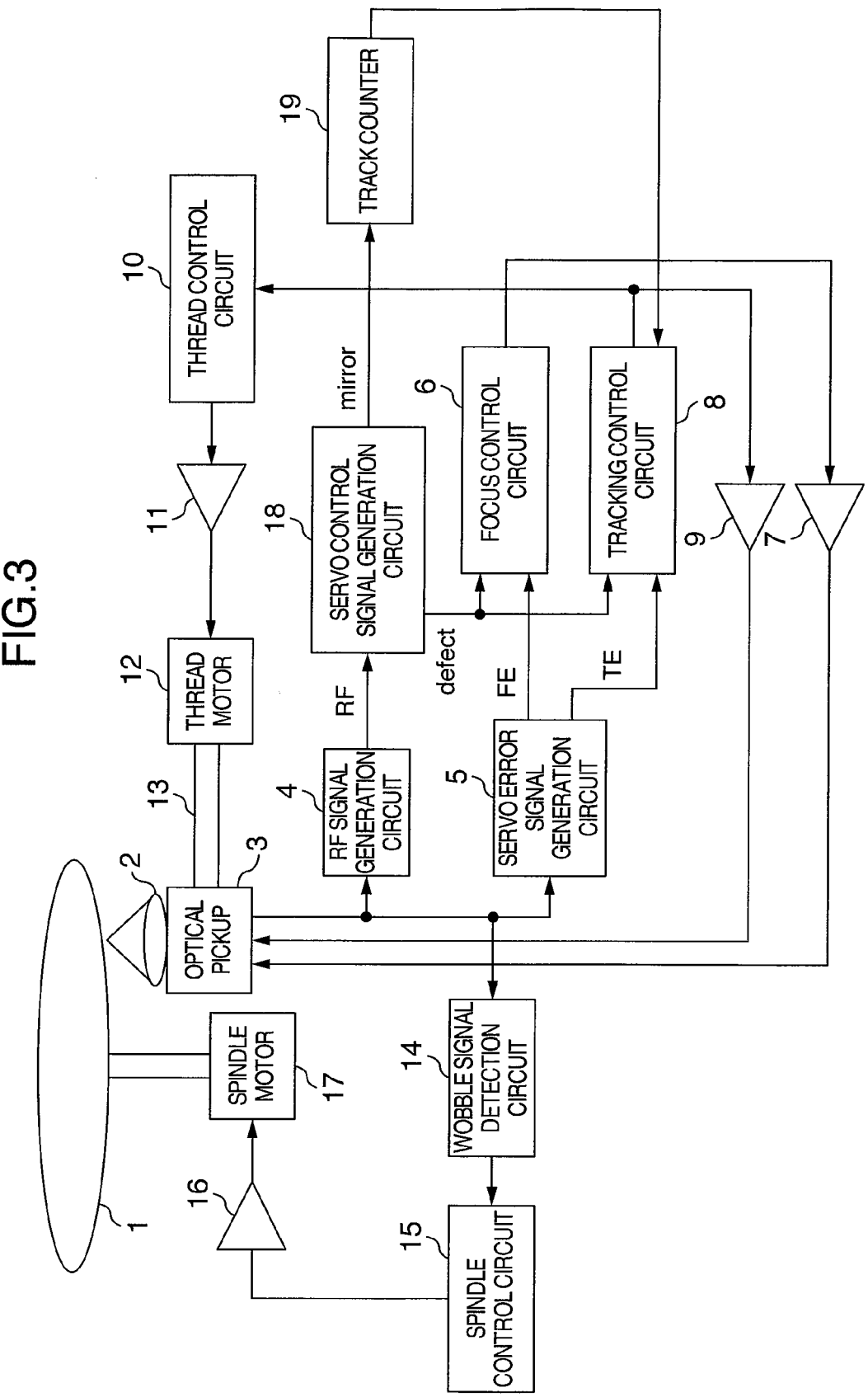
FIG. 3 is a block diagram of an optical disk device showing a first embodiment of the present invention.

FIG. 3 is a block diagram showing an example of an optical disk device according to the present invention.

Reference numeral 1 denotes an optical disk. The optical disk 1 has a recording layer using a phase change film or an organic metal film. The optical disk 1 can record data on the recording layer. Recording tracks have a land-groove structure. The recording tracks are formed so as to meander (wobble) at definite periods. Hereafter, the meandering of the recording tracks is referred to as wobbling.

Reference numeral 2 denotes an objective lens. The objective lens 2 focuses laser light emitted from an optical pickup 3 onto a recording face of the optical disk 1.

Reference numeral 3 denotes an optical pickup. The optical pickup 3 includes a laser light source, a focus actuator, and a tracking actuator. Furthermore, the optical pickup 3 includes the known 4-division photodetector, detects a quantity of light reflected by the optical disk 1, and outputs a detected signal.

Reference numeral 4 denotes an RF signal generation circuit. The RF signal generation circuit 4 conducts equalization processing on the detected signal output from the optical pickup 3, and outputs a resultant signal as an RF signal.

Reference numeral 5 denotes a servo error signal generation circuit. The servo error signal generation circuit 5 generates a focus error signal (hereafter referred to as FE signal) and a tracking error signal (hereafter referred to as TE signal).

Reference numeral 6 denotes a focus control circuit. The focus control circuit 6 conducts gain and phase compensation on the FE signal, and outputs a resultant signal as a focus drive signal. Furthermore, the focus control circuit 6 brings a focus control mode into hold operation over a defect time period in response to a defect signal output from a servo control signal generation circuit 18.

Reference numeral 7 denotes a driver circuit. The drive circuit 7 amplifies the focus drive signal, and supplies a resultant output to the focus actuator in the optical pickup 3.

Reference numeral 8 denotes a tracking control circuit. The tracking control circuit 8 conducts gain and phase compensation on the TE signal, and outputs a resultant signal as a tracking drive signal. Furthermore, the tracking control circuit 8 holds a tracking control mode over the defect time period in response to the defect signal output from the servo control signal generation circuit 18. In addition, at the time of seek, the tracking control circuit 8 conducts seek operation according to the number of crossing tracks output from a track counter 19.

Reference numeral 9 denotes a driver circuit. The driver circuit 9 amplifies the tracking drive signal, and supplies a resultant output to the tracking actuator in the optical pickup 3.

Reference numeral 10 denotes a thread control circuit. The thread control circuit 10 extracts a low frequency band component from the tracking drive signal output from the tracking control circuit, conducts gain and phase compensation on the extracted DC component, and outputs a resultant signal as a thread drive signal.

Reference numeral 11 denotes a driver circuit. The driver circuit 11 amplifies the thread drive signal and outputs a resultant signal.

Reference numeral 12 denotes a thread motor. The thread motor 12 operates according to the output of the driver circuit 11.

Reference numeral 13 denotes a lead screw. The lead screw 13 is connected to the thread motor 12. The lead screw 13 moves the optical pickup 3 in its radial direction according to the rotation of the thread motor 12.

Reference numeral 14 denotes a wobble signal detection circuit. The wobble signal detection circuit 14 detects a clock signal synchronized to wobbles of the optical disk 1, from the detected signals output from the optical pickup 3, and outputs the clock signal.

Reference numeral 15 denotes a spindle control circuit. Its output signal is a spindle drive signal. The spindle control circuit 15 controls rotation of a spindle motor 17 so as to make the clock signal output from the wobble signal detection circuit 14 have a definite period. Since the wobbles are formed on the recording tracks at definite periods, the optical disk 1 is rotated at a constant linear velocity (CLV).

Reference numeral 16 denotes a driver circuit. The driver circuit 16 amplifies the spin drive signal, and outputs a resultant signal.

Reference numeral 17 denotes a spindle motor. The spindle motor 17 is rotated according to the output of the driver circuit 16.

Reference numeral 18 denotes a servo control signal generation circuit. The servo control signal generation circuit 18 generates a defect signal and a mirror signal by using the RF signal. The servo control signal generation circuit 18 in which the present invention differs from the prior art most remarkably. Its detailed operation will be described in detail.

Reference numeral 19 denotes a track counter. The track counter 19 counts edges of the error signal in the seek operation, and finds the number of crossing tracks.

Figure 4:
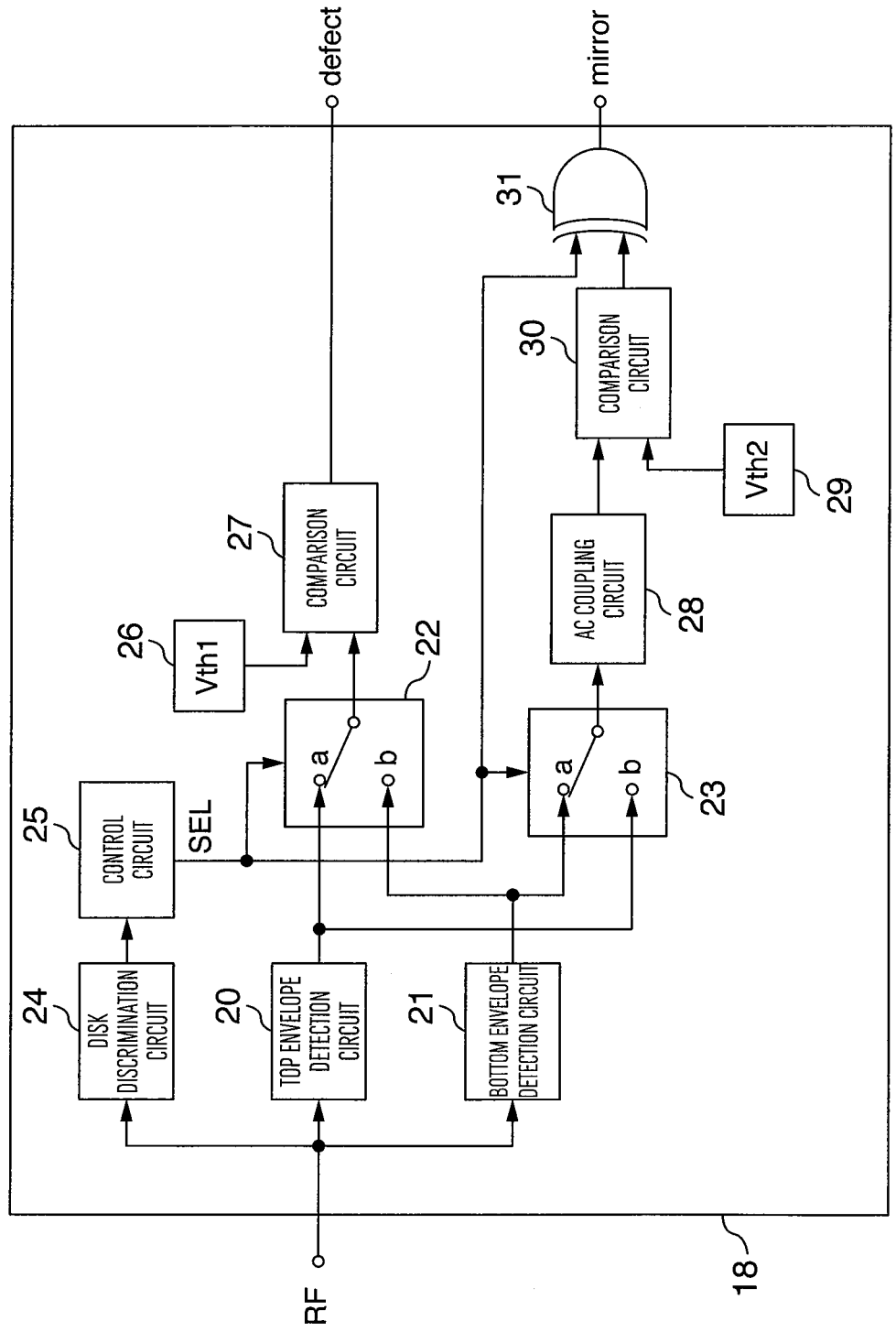
FIG. 4 is a block diagram of a servo control signal generation circuit showing a first embodiment of the present invention.

Details of the servo control signal generation circuit 18 will now be described with reference to FIG. 4.

Reference numeral 20 denotes a top envelope detection circuit. The top envelope detection circuit 20 detects a top envelope of the RF signal and outputs it.

Reference numeral 21 denotes a bottom envelope detection circuit. The bottom envelope detection circuit 21 detects a bottom envelope of the RF signal and outputs it.

Reference numeral 22 denotes a selection circuit. An input terminal "a" of the selection circuit 22 is connected to the output signal of the top envelope detection circuit 20. An input terminal "b" of the selection circuit 22 is connected to the output signal of the bottom envelope detection circuit 21. The selection circuit 22 switches to the input terminal "a" when a SEL signal output from a control circuit 25 is at a low level. The selection circuit 22 switches to the input terminal "b" when the SEL signal output from the control circuit 25 is at a high level. Thus, the selection circuit 22 selects an input signal and outputs the selected input signal.

Reference numeral 23 denotes a selection circuit. An input terminal "a" of the selection circuit 23 is coupled to the output signal of the bottom envelope detection circuit 21. An input terminal "b" of the selection circuit 23 is coupled to the output signal of the top envelope detection circuit 20. The selection circuit 23 switches to the input terminal "a" when a SEL signal output from a control circuit 25 is at a low level. The selection circuit 23 switches to the input terminal "b" when the SEL signal output from the control circuit 25 is at a high level. Thus, the selection circuit 23 selects an input signal and outputs the selected input signal.

Reference numeral 24 denotes a disk discrimination circuit. The disk discrimination circuit 24 determines whether the disk attached to the optical disk device is a High-to-Low medium or a Low-to-High medium on the basis of the RF signal, and conveys a result of the discrimination to a control circuit 25.

Reference numeral 25 denotes a control circuit. The control circuit 25 changes over the SEL signal to the low or high level to control the selection circuits 22 and 23. In the present embodiment, the SEL signal is set to the low level when the disk discrimination result is the High-to-Low medium, whereas the SEL signal is set to the high level when the disk discrimination result is the Low-to-High medium.

Reference numeral 26 denotes a first threshold voltage. A voltage Vth1 is output.

Reference numeral 27 denotes a first comparison circuit. The first comparison circuit 27 compares the output of the selection circuit 22 with the voltage Vth1. If the output of the selection circuit 22 is lower than the voltage Vth1, the first comparison circuit 27 outputs a high level as a defect signal. If the output of the selection circuit 22 is higher than the voltage Vth1, the first comparison circuit 27 outputs a low level as the defect signal.

Reference numeral 28 denotes an AC coupling circuit. The AC coupling circuit 28 intercepts a DC component from the output of the selection circuit 23, and outputs an AC component.

Reference numeral 29 denotes a second threshold voltage. A voltage Vth2 is output. In the present embodiment, a 0 level is set.

Reference numeral 30 denotes a second comparison circuit. The second comparison circuit 30 compares the output of the AC coupling circuit 28 with the voltage Vth2. If the output of the AC coupling circuit 28 is higher than the voltage Vth2, the second comparison circuit 30 outputs a high level. If the output of the AC coupling circuit 28 is lower than the voltage Vth2, the second comparison circuit 30 outputs a low level.

Reference numeral 31 denotes an exclusive OR circuit. One of two inputs of the exclusive OR circuit 31 is coupled to the output signal of the second comparison circuit 30. The other input is coupled to the SEL signal output from the control circuit 25. When the SEL signal is at the low level, i.e., when the optical disk is the High-to-Low medium, the output of the second comparison circuit 30 is output intact. When the SEL signal is at the high level, i.e., when the optical disk is the Low-to-High medium, the output of the second comparison circuit 30 is inverted and output. In other words, the exclusive OR circuit functions as a polarity inversion circuit, and its output is used as a mirror signal.

In the state in which the spindle motor 17 is being rotated stationarily in the configuration heretofore described, the optical disk device determines whether the attached optical disk 1 is a High-to-Low medium or a Low-to-High medium.

As for the disk discrimination method, focus control on the recording face of the optical disk is turned on, and then the objective lens 2 is located in a BCA (Burst Cutting Area) recorded on an inner circumference part of the disk beforehand. In this way, the disk discrimination circuit 24 can reproduce BCA data and discriminate the kind of the optical disk on the basis of a disk ID contained in the reproduced data. Or if a bit which indicates whether the disk is a High-to-Low medium or a Low-to-High medium is defined in the BCA data, the kind of the disk may be discriminated by using the bit.

If the disk has no BCA recorded thereon, it is possible to determine whether the disk is a High-to-Low medium or a Low-to-High medium by conducting seeking operation in a lead-in area in the inner circumference part of the disk and reading out a disk ID recorded in the lead-in area.

Upon receiving the disk discrimination result, the control circuit 25 outputs a low level as the SEL signal when the optical disk 1 is a High-to-Low medium, or the control circuit 25 outputs a high level as the SEL when the optical disk 1 is a Low-to-High medium.

The defect signal and the mirror signal generated by the operation heretofore described will now be described separately for the High-to-Low media and the Low-to-High media.

First, the case of the High-to-Low media will now be described.

The control circuit 25 outputs the low level as the SEL signal. Therefore, both the selection circuits 22 and 23 are switched to the input "a" side. The top envelope signal of the RF signal output from the top envelope detection circuit 20 is input to the first comparison circuit 27 via the selection circuit 22. As a result, the top envelope signal is compared with the voltage Vth1 output from the first threshold voltage 26 by the comparison circuit 27. While the top envelope signal is lower than the voltage Vth1, the output of the comparison circuit 27 assumes a high level. Therefore, the output of the comparison circuit 27 becomes the defect signal having a waveform similar to that shown on the left-hand side of FIG. 1(c).

The bottom envelope signal of the RF signal output from the bottom envelope detection circuit 21 is input to the second comparison circuit 30 via the selection circuit 23 and the AC coupling circuit 28. As a result, the bottom envelope signal is compared with the voltage Vth2 output from the second threshold voltage 29 by the comparison circuit 30, and the mirror signal is generated. Since the SEL signal input to the exclusive OR circuit 31 is at the low level, the mirror signal is not inverted in polarity and the mirror signal has a waveform similar to that shown on the left-hand side of FIG. 2(d).

Figure 1:
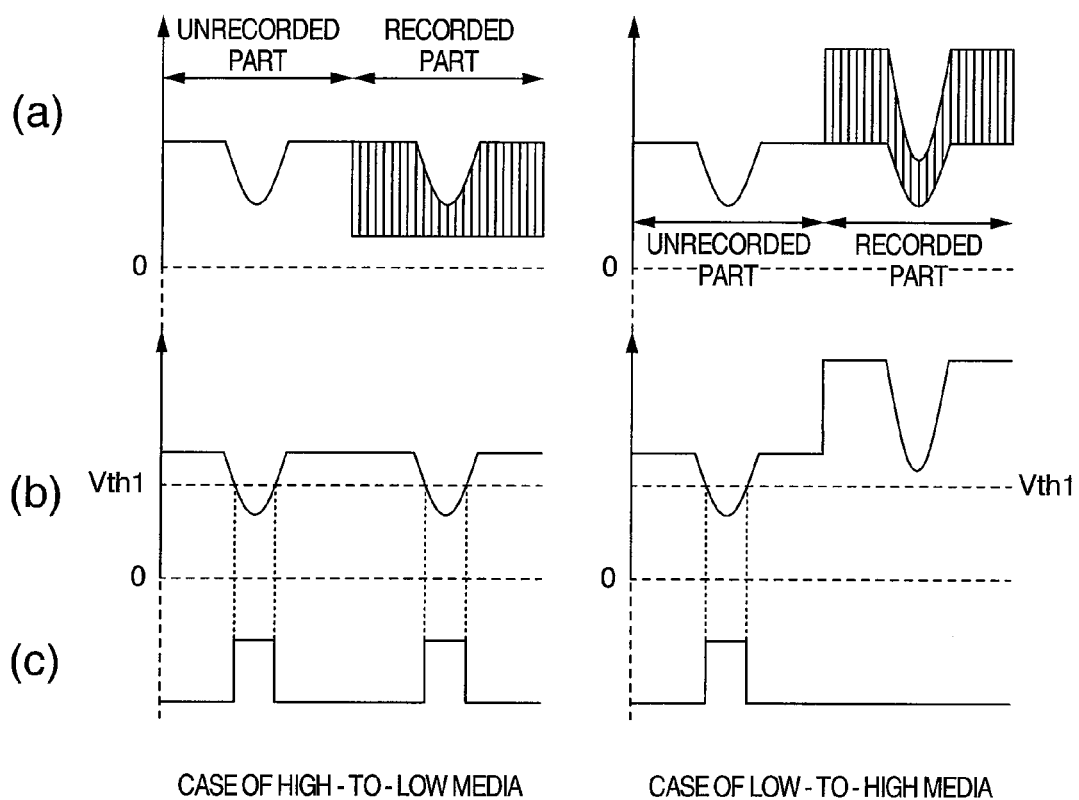
FIG. 1 is a waveform diagram showing a generation process of a defect signal in the prior art.
Figure 2:
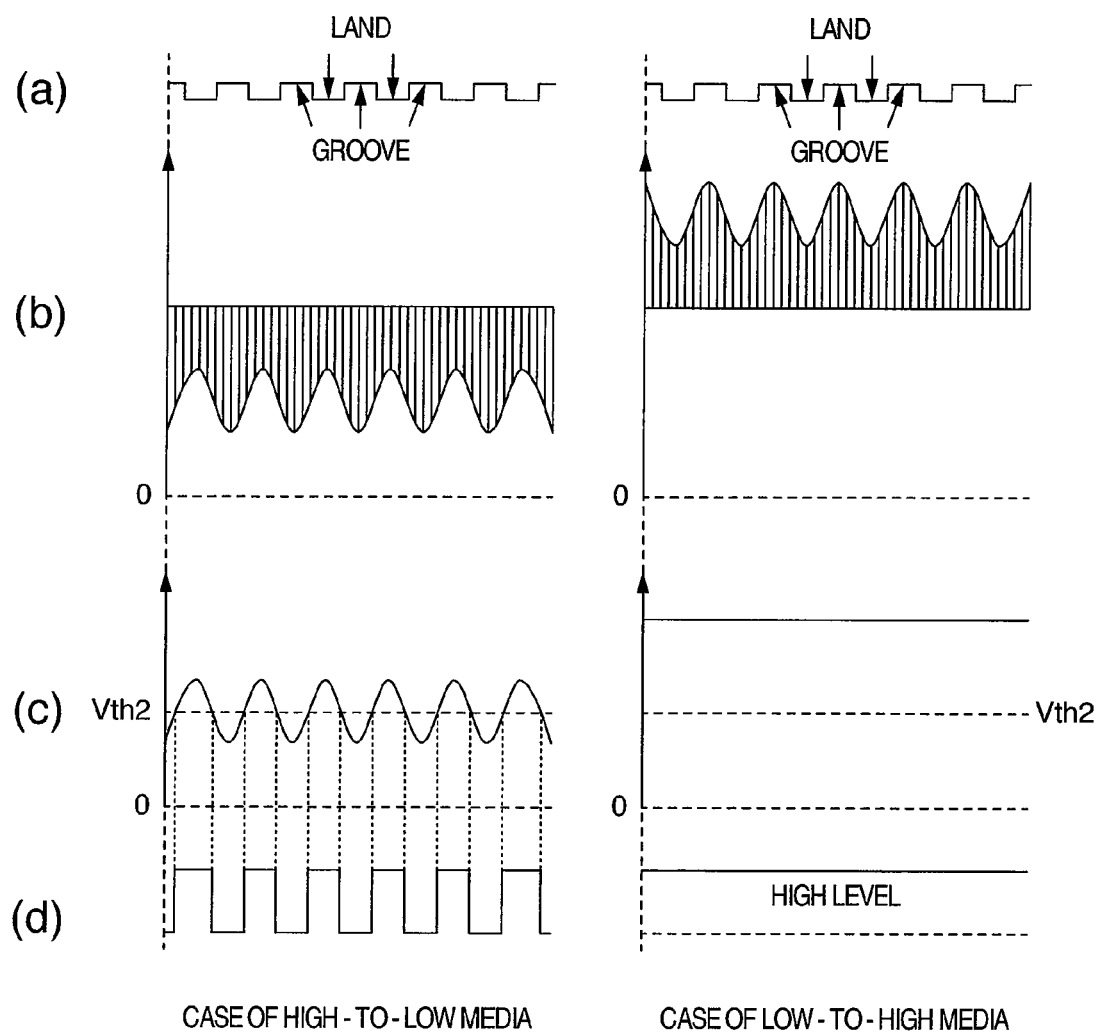
FIG. 2 is a waveform diagram showing a generation process of a mirror signal in the prior art.

As heretofore described, the defect signal and the mirror signal in the High-to-Low media have waveforms similar to those in the prior art shown in FIGS. 1 and 2, respectively.

The case of the Low-to-High media will now be described.

Figure 5:
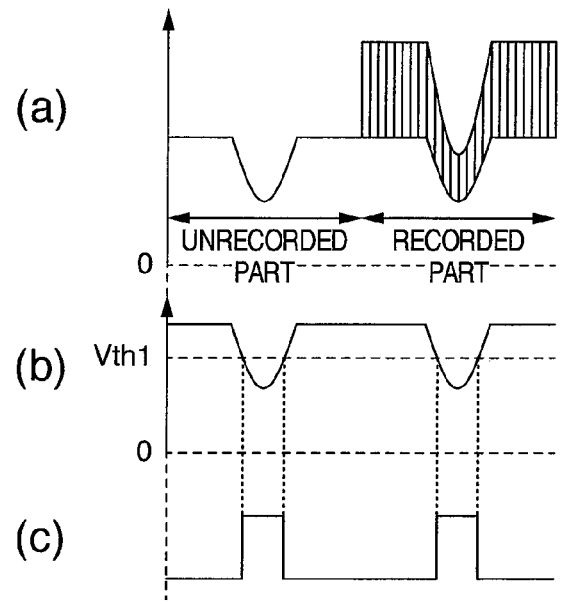
FIG. 5 is a waveform diagram showing a generation process of a defect signal in a first embodiment of the present invention.

The control circuit 25 outputs the high level as the SEL signal. Therefore, both the selection circuits 22 and 23 are switched to the input "b" side. Therefore, the bottom envelope signal of the RF signal output from the bottom envelope detection circuit 21 is input to the first comparison circuit 27 via the selection circuit 22. Signal waveforms in this case are shown in FIG. 5.

FIG. 5(a) shows an RF signal waveform of the Low-to-High media which is the same as the right-hand waveform in FIG. 1(a). A level drop of the RF signal is caused by a defect part in each of the unrecorded part and the recorded part.

FIG. 5(b) shows a bottom envelope of the RF signal (a) input to the first comparison circuit 27 via the selection circuit 22.

FIG. 5(c) shows a defect signal output from the comparison circuit 27. While the bottom envelope signal (b) is lower than the voltage Vth1, the defect signal assumes a high level. Therefore, it is appreciated that the defect signal according to the present embodiment shown in FIG. 5(c) represents defects in both the unrecorded part and the recorded part correctly, unlike the defect signal in the prior art represented by the right-hand waveform in FIG. 1(c).

Figure 6:
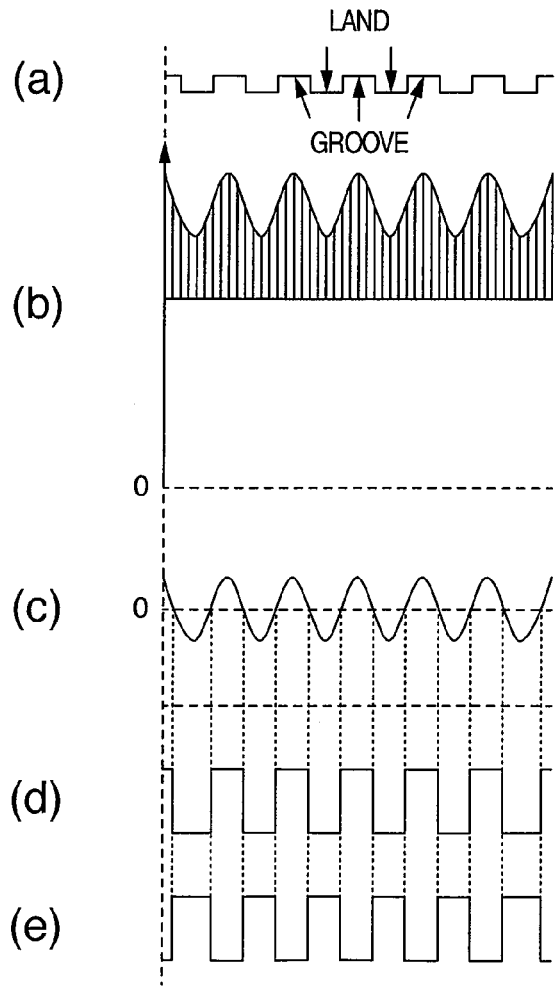
FIG. 6 is a waveform diagram showing a generation process of a mirror signal in a first embodiment of the present invention.

The top envelope signal of the RF signal output from the top envelope detection circuit 20 is input to the second comparison circuit 30 via the selection circuit 23 and the AC coupling circuit 28. Signal waveforms in this case are shown in FIG. 6.

FIG. 6(a) shows a sectional view of a recording film. The recording film has a land-groove structure. By the way, it is supposed that recording marks are formed only on the grooves and information is already recorded on the grooves, in the same way as FIG. 1(a).

FIG. 6(b) shows an RF signal obtained when a laser spot is crossing tracks in the Low-to-High media, in the same way as the right-hand waveform in FIG. 1(a). The RF signal has large amplitude in grooves having recording marks formed therein and the RF signal has small amplitude in lands having no recording marks formed therein.

FIG. 6(c) shows the output of the AC coupling circuit 28. It is the top envelope signal of the RF signal input via the selection circuit 23.

FIG. 6(d) shows the output of the comparison circuit 30. While the top envelope signal (c) is higher than a 0 level which is set to the voltage Vth2, the output of the comparison circuit 30 assumes a high level.

FIG. 6(e) shows the output of the exclusive OR circuit 31. Since the SEL signal is at the high level, the output (d) of the comparison circuit with the polarity inverted is obtained as the output of the exclusive OR circuit 31. Parts having a low level in the RF signal (b) correspond to lands serving as mirror parts. Over time periods of those parts, the waveform (e) assumes a high level. On the contrary, parts having a high level in the RF signal (b) correspond to grooves serving as recording parts. Over time periods of those parts, the waveform (e) assumes a low level. Therefore, it is possible to discriminate the mirror parts and the recording tracks on the basis of the waveform (e). And the waveform (e) can be used as the mirror signal.

In the description of FIG. 6, the output waveform (c) of the AC coupling circuit 28 is output so as to have the 0 level as the reference. Alternatively, an arbitrary reference level may be used as the reference. If in that case the reference level Vref is set equal to the output voltage Vth2 of the second threshold voltage 29, the mirror signal has a waveform similar to that shown in FIG. 6(e).

In the optical disk device according to the first embodiment heretofore described, the generation subject signal of the defect signal and the mirror signal is changed over to the top envelope signal or the bottom envelope signal of the RF signal according to the kind of the attached optical disk. Therefore, the defect signal and the mirror signal can be generated correctly in both the High-to-Low media and the Low-to-High media.

Second Embodiment

Hereafter, a second embodiment according to the present invention will be described.

In the optical disk, the reflectance often varies in the disk face within a range of standard values. As a result, the bottom envelope signal of the RF signal is also affected by the variation in disk reflectance. This results in a problem that the mirror signal cannot be generated correctly. A technique of generating a top hold signal and a bottom hold signal of the bottom envelope signal and using a middle level between them as a threshold level for generating the mirror signal in order to solve the problem is known.

If it is attempted to apply this method to the Low-to-High media, however, then the mirror signal cannot be generated correctly because the bottom envelope in the Low-to-High media is not modulated by the recorded tracks/unrecorded tracks as described with reference to FIG. 2(b).

In the present embodiment, therefore, a method by which it becomes possible to avoid the influence of the reflectance variation in the disk face and generate the mirror signal accurately in both the High-to-Low media and the Low-to-High media will be described.

Figure 7:
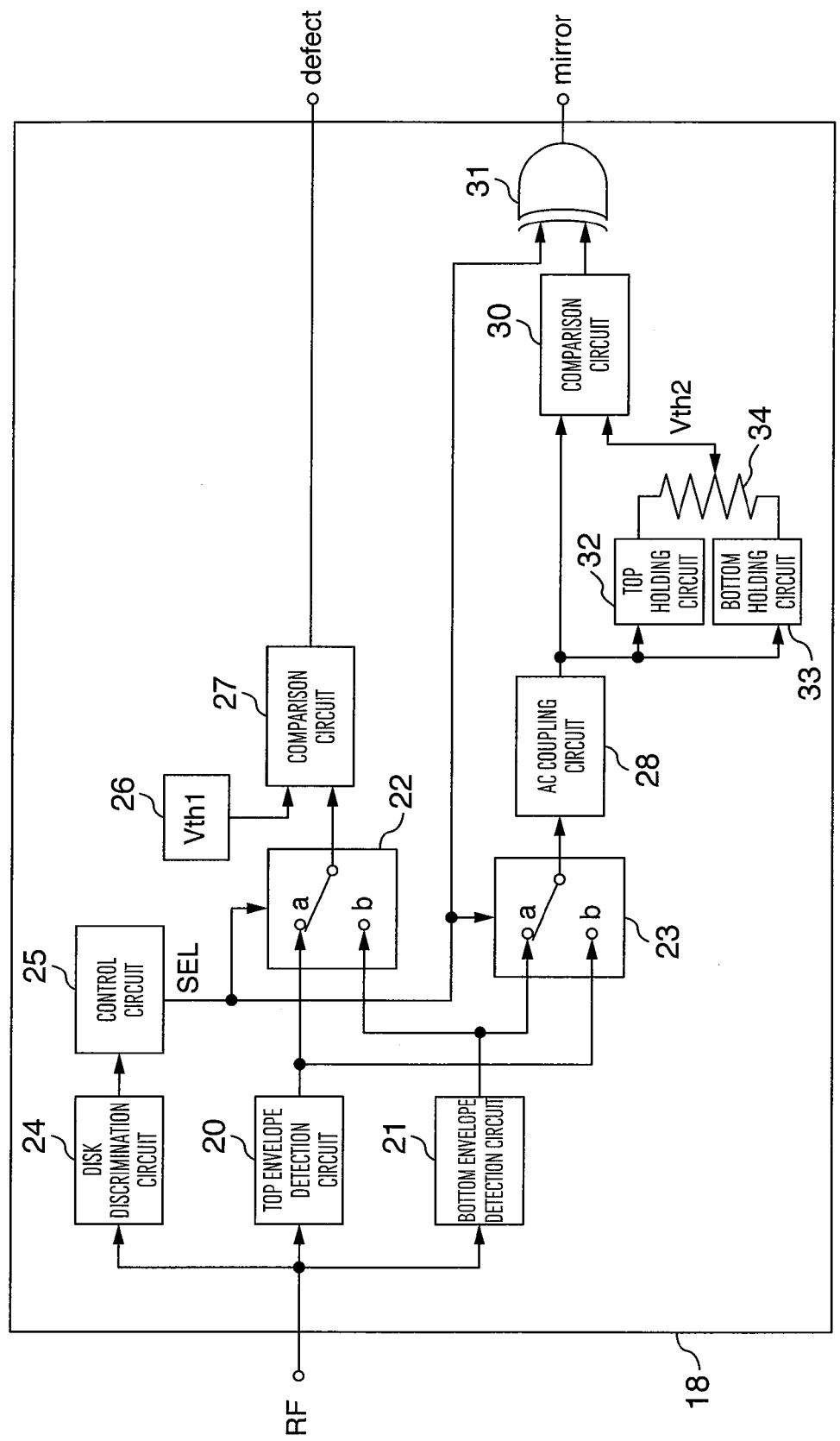
FIG. 7 is a block diagram of a servo control signal generation circuit showing a second embodiment of the present invention.

The second embodiment differs from the first embodiment in the mirror signal generator in the servo control signal generation circuit 18. A servo control signal generation circuit 18 in the second embodiment is shown in FIG. 7. Hereafter, a part in FIG. 7 that differs from the first embodiment will be described.

Reference numeral 32 denotes a top hold circuit. The top hold circuit 32 outputs a top hold signal obtained by holding the top level of the output of the AC coupling circuit 28. If an input signal level is higher than a current output signal level of the top hold circuit, then the output signal follows the input signal. If the input signal level goes lower than the output signal level, then the output signal level falls with a predetermined time constant.

Reference numeral 33 denotes a bottom hold circuit. The bottom hold circuit 33 outputs a bottom hold signal obtained by holding a bottom level of the output of the AC coupling circuit 28. If an input signal level is lower than a current output signal level of the bottom hold circuit, then the output signal follows the input signal. If the input signal level goes higher than the output signal level, then the output signal level rises with a predetermined time constant.

Reference numeral 34 denotes a potentiometer. The potentiometer conducts voltage division between the output voltages of the top hold circuit 32 and the bottom hold circuit 33 and outputs a resultant voltage. In the present embodiment, the voltage division ratio is set to 1:1 to output a middle level between the top hold level and the bottom hold level.

A comparison circuit 30 in the second embodiment outputs a high level if the output of the AC coupling circuit 28 is higher than the output of the potentiometer 34. If the output of the AC coupling circuit 28 is lower than the output of the potentiometer 34, the comparison circuit 30 outputs a low level.

Operation waveforms in the configuration heretofore described is shown in FIG. 8. In FIG. 8, left-hand waveforms correspond to the High-to-Low media, whereas right-hand waveforms correspond to Low-to-High media.

FIG. 8(a) shows sectional views of recording films in the same way as FIG. 2(a). The recording films have a land-groove structure. By the way, it is supposed that recording marks are formed only on the grooves and information is already recorded on the grooves.

FIG. 8(b) shows an RF signal obtained when a laser spot is crossing tracks in a tracking control off state. In both the High-to-Low media and the Low-to-High media, the RF signal has large amplitude in grooves having recording marks formed therein and the RF signal has small amplitude in lands having no recording marks formed therein. In addition, the top envelope and the bottom envelope vary under the influence of the reflectance variation in the disk face. This fact can also be confirmed on the basis of that the top envelope of the RF signal in the High-to-Low media and the bottom envelope of the RF signal in the Low-to-High media which are not modulated by the recorded tracks/unrecorded tracks vary.

FIG. 8(c) shows the output of the AC coupling circuit 28. In the case of the High-to-Low media, the bottom envelope signal of the RF signal is selected by the selection circuit 23 and output. In the case of the Low-to-High media, the top envelope signal of the RF signal is selected by the selection circuit 23 and output. The top hold signal output from the top hold circuit 32 and the bottom hold signal output from the bottom hold circuit 33 are shown in FIG. 8(c). Furthermore, a threshold voltage Vth2 output from the potentiometer 34 is shown in FIG. 8(c). The threshold voltage Vth2 is a middle level between the top hold signal level and the bottom hold signal level shown in FIG. 8(c).

FIG. 8(d) shows an output waveform of the second comparison circuit 30. While the output signal level of the AC coupling circuit shown in FIG. 8(c) is higher than the threshold voltage Vth2, the output waveform of the second comparison circuit 30 assumes a high level.

FIG. 8(e) shows a SEL signal output from a control circuit 25. In the case of the High-to-Low media, the SEL signal assumes a low level. In the case of the Low-to-High media, the SEL signal assumes a high level.

FIG. 8(f) shows a mirror signal output from an exclusive OR circuit 31. In the High-to-Low media, the mirror signal is the same as the output waveform (d) of the second comparison circuit 30. In the Low-to-High media, the mirror signal is the same as a waveform obtained by inverting in polarity the output waveform (d) of the second comparison circuit 30.

In comparing the mirror signal (f) in FIG. 8 with the recording film sectional view (a), time periods over which the mirror signal (f) assumes the high level coincide with lands, whereas time periods over which the mirror signal (f) assumes the low level coincide with grooves. Since the grooves have information recorded therein as described with reference to FIG. 8(a), the lands serve as the mirror parts having no information recorded thereon. Since the mirror signal (f) shown in FIG. 8 thus coincides with the lands serving as the mirror parts of the optical disk, it is appreciated that the mirror parts can be detected correctly.

In the optical disk device according to the second embodiment heretofore described, the threshold level for generating the mirror signal is found on the basis of the top hold signal and the bottom hold signal of the envelope signal of the RF signal modulated by the recorded tracks/unrecorded tracks. Even if the reflectance of the optical disk varies in the disk face, therefore, the mirror signal can be generated correctly. In addition, since the envelope signal for generating the mirror signal is switched to the bottom envelope and the top envelope according to the kind of the optical disk, the mirror signal can be generated correctly in both the High-to-Low media and the Low-to-High media.

In the description of the second embodiment, the voltage division ratio of the potentiometer 34 is 1:1. Alternatively, the voltage division ratio may be adjusted to be 0.95:1.05 so as to provide the duty ratio of the mirror signal with a desired value.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A servo control signal generation device corresponding to reproduction of optical disks having a reflectance after recording which is lower than that before recording and optical disks having a reflectance after recording which is higher than that before recording, said servo control signal generation device comprising:
  a RF generator which generates a RF signal on the basis of reflected light of an optical disk;
  a top envelope generator which generates a top envelope signal of the RF signal;
  a bottom envelope generator which generates a bottom envelope signal of the RF signal; and
  a signal selector which selects a signal from the top envelope signal and the bottom envelope signal on the basis of a kind of the optical disk as to whether the optical disk is an optical disk having a reflectance after recording which is lower than that before recording or an optical disk having a reflectance after recording which is higher than that before recording and generates a defect signal on the basis of the selected signal.

2. A servo control signal generation device corresponding to reproduction of optical disks having a reflectance after recording which is lower than that before recording and optical disks having a reflectance after recording which is higher than that before recording, said servo control signal generation device comprising:
  a RF generator which generates a RF signal on the basis of reflected light of an optical disk;
  a top envelope generator which generates a top envelope signal of the RF signal;
  a bottom envelope generator which generates a bottom envelope signal of the RF signal;
  a signal generator which generates, when the optical disk belongs to a kind of optical disks having a reflectance after recording which is lower than that before recording, a defect signal from the top envelope signal and a mirror signal from the bottom envelope signal, and generates, when the optical disk belongs to a kind of optical disks having a reflectance after recording which is higher than that before recording, a defect signal from the bottom envelope signal and a mirror signal from the top envelope signal; and a polarity changer which changes over polarity of said mirror signal according to whether the optical disk belongs to a kind of optical disks having a reflectance after recording which is lower than that before recording, or the optical disk belongs to a kind of optical disks having a reflectance after recording which is higher than that before recording.

3. A servo control signal generation device corresponding to reproduction of optical disks having a reflectance after recording which is lower than that before recording and optical disks having a reflectance after recording which is higher than that before recording, said servo control signal generation device comprising:

a RF generator which generates a RF signal on the basis of reflected light of an optical disk;

a top envelope generator which generates a top envelope signal of the RF signal;

a bottom envelope generator which generates a bottom envelope signal of the RF signal;

a first selector which selects and outputs the top envelope signal when the optical disk belongs to a kind of optical disks having a reflectance after recording which is lower than that before recording, and selects and outputs the bottom envelope signal when the optical disk belongs to a kind of optical disks having a reflectance after recording which is higher than that before recording;

a second selector which selects and outputs the bottom envelope signal when the optical disk belongs to a kind of optical disks having a reflectance after recording which is lower than that before recording, and selects and outputs the top envelope signal when the optical disk belongs to a kind of optical disks having a reflectance after recording which is higher than that before recording;

a first detector which detects when an output signal level of said first selector is lower than a first predetermined level;

a low frequency band rejection unit which removes a DC component from an output signal of said second selector;

a second detector which detects when an output signal level of said low frequency band rejection unit is higher than a second predetermined level; and a polarity changer which changes over polarity of an output signal from said second detector according to whether the optical disk belongs to a kind of optical disks having a reflectance after recording which is lower than that before recording, or the optical disk belongs to a kind of optical disks having a reflectance after recording which is higher than that before recording, wherein an output signal of said first detector is used as a defect signal, and an output signal of said polarity changer is used as a mirror signal.

4. A servo control signal generation device corresponding to reproduction of optical disks having a reflectance after recording which is lower than that before recording and optical disks having a reflectance after recording which is higher than that before recording, said servo control signal generation device comprising:

a RF generator which generates a RF signal on the basis of reflected light of an optical disk;

a top envelope generator which generates a top envelope signal of the RF signal;

a bottom envelope generator which generates a bottom envelope signal of the RF signal;

a changeover unit which changes over between the top envelope signal and the bottom envelope signal and outputs a resultant signal;

a low frequency band rejection unit which removes a DC component from the output of said changeover unit;

a top hold unit which holds a top level of an output of said low frequency band rejection unit;

a bottom hold unit which holds a bottom level of an output of said low frequency band rejection unit;

a potentiometer which conducts voltage division between an output signal of said top hold unit and an output signal of said bottom hold unit and outputs a resultant signal;

a comparator which compares the output of said low frequency band rejection unit with an output of said potentiometer and outputs a two-valued signal obtained by the comparison as a mirror signal; and a polarity changer which changes over polarity of said mirror signal according to whether the optical disk belongs to a kind of optical disks having a reflectance after recording which is lower than that before recording, or the optical disk belongs to a kind of optical disks having a reflectance after recording which is higher than that before recording, wherein when the optical disk belongs to a kind of optical disks having a reflectance after recording which is lower than that before recording, said changeover unit outputs the bottom envelope signal, and when the optical disk belongs to a kind of optical disks having a reflectance after recording which is higher than that before recording, said changeover unit outputs the top envelope signal.

5. A servo control signal generation device according to claim 4, wherein said potentiometer conducts voltage division between the output signal of said top hold unit and the output signal of said bottom hold unit with a ratio of 1:1.

6. A servo control signal generation device according to any one of claims 1 to 4, wherein whether the reflectance of the optical disk after recording falls or rises as compared with that before recording, is determined on the basis of a disk ID recorded in a BCA area or a read-in area of the optical disk.

7. An optical disk device comprising a servo control signal generation device according to any one of claims 1 to 4, wherein servo control is brought into hold operation during time when a defect is detected in the defect signal.

8. An optical disk device comprising a servo control signal generation device according to any one of claims 2 to 4, wherein the number of crossing tracks is counted by using the mirror signal.

* * * * *